Sept. 30, 1969   A. TRUHAN   3,469,782
ENVIRONMENTAL COMPARTMENT TEMPERATURE CONTROL
Filed July 26, 1967   2 Sheets-Sheet 1

INVENTOR
ANDREW TRUHAN

BY Stowell & Stowell

ATTORNEYS

INVENTOR
ANDREW TRUHAN
ATTORNEYS

United States Patent Office 3,469,782
Patented Sept. 30, 1969

3,469,782
ENVIRONMENTAL COMPARTMENT
TEMPERATURE CONTROL
Andrew Truhan, R.D. 3, Box 392T,
Somerset, N.J. 08873
Filed July 26, 1967, Ser. No. 656,202
Int. Cl. G05d 23/24
U.S. Cl. 237—2
5 Claims

ABSTRACT OF THE DISCLOSURE

A controlled temperature and humidity compartment having a plurality of independently regulatable chambers therein. Valves are provided to regulate the flow of gas through each of the chambers and independent heating units and controls for each chamber provide a final determination of the temperature and humidity of the gas passed therethrough. A fan circulates a stream of gas from the chambers through a temperature and humidity regulating unit having a liquid sump with heating and cooling coils submerged therein to a distribution channel for controlled distribution and recirculation through the chambers. Control is provided to maintain the sump at a desired temperature by suitable actuation of the heating and/or cooling coils and the liquid is sprayed into the gas stream to initially regulate the temperature and humidity thereof.

Background of the invention

This invention relates to improved environmental compartments and more particularly to such compartments in which a range of individual controlled environmental conditions may be provided to a plurality of separate chambers situated therein. Means are provided to provide independent, final control for the environmental conditions existing in each of the chambers. Compartments of the foregoing type are desirable for the study of chemicals, pharmaceuticals, plastics, rubbers, bacteria, paints, packaging materials, food products, electrical and electronics products, and the like.

Summary of the invention

This invention provides an apparatus wherein a plurality of chambers in a compartment may be relatively uniformly maintained, within wide limits, at a predetermined temperature and humidity and wherein the individual chambers may have the environment contained therein controlled independently of one another.

Other objects and advantages of the invention are provided by furnishing a temperature and humidity controlled compartment having a plurality of chambers disposed in spaced relationship with respect thereto, therein and in spaced relationship to one another along an axis of alignment extending through the chambers; inlet and outlet distribution channels defined by the space between the compartment and an opposed pair of chamber walls parallel to the axis of alignment; at least a pair of gas-permeable walls for each of the chambers; a gas inlet plenum positioned in coextensive relationship with one of the gas-permeable walls exteriorly of each chamber and in communication with the inlet distribution channel; a gas outlet plenum positioned in coextensive relationship to the other of the gas-permeable walls exteriorly of each chamber and in communication with the gas outlet distribution channel; and valve means disposed between each of the inlet plenums and the gas inlet distribution channel to controllably regulate the flow of gas therebetween; heating means including a temperature sensor in each of the chambers and a corresponding control to independently supply heat to the gas entering the inlet plenums; and a gas-treating chamber communicating with the inlet and outlet distribution channels.

Brief description of the drawings

The invention will be particularly described with reference to the following detailed description of a preferred embodiment of the invention when considered together with the attached drawings in which.

Description of the preferred embodiment

Figure 1:
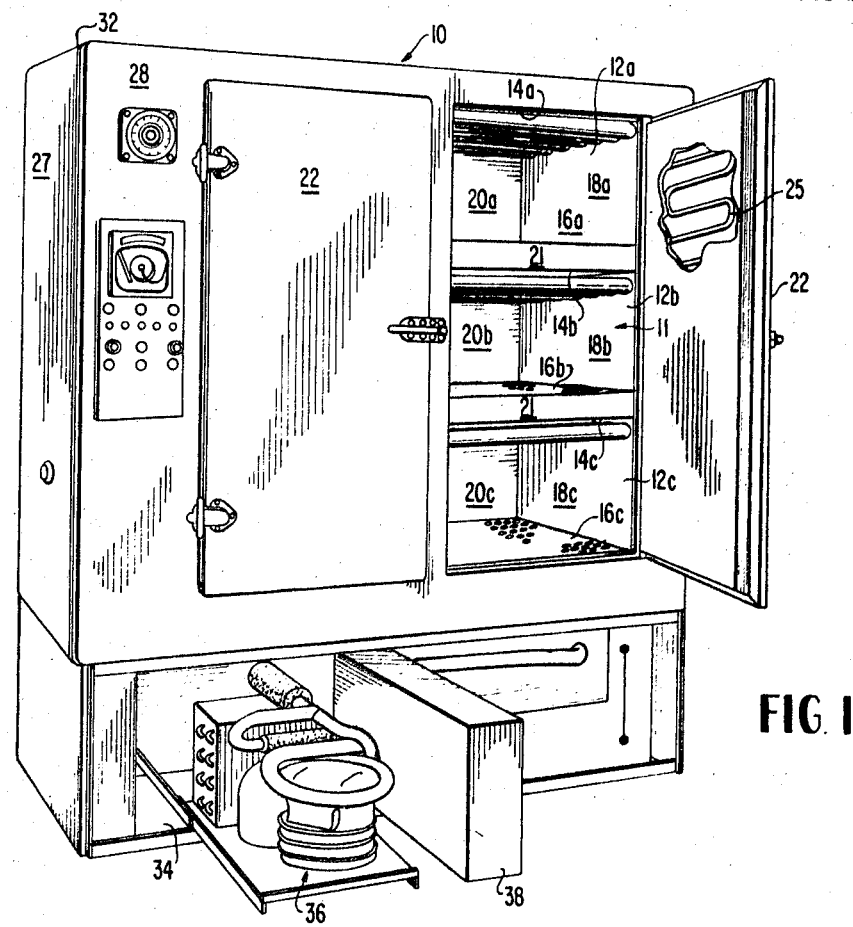
FIGURE 1 is a perspective view of a controlled environmental compartment constructed in accordance with the teachings of this invention.

Referring to the drawings and in particular to FIGURE 1, 10 generally designates a housing for enclosing improved temperature and humidity controlled chambers in accordance with this invention. The housing 10 includes a compartment, generally designated at 11 which, in turn, encloses a plurality of chambers 12a, 12b and 12c. The chambers are defined by top and bottom perforate walls 14a through 14c and 16a through 16c, side walls 18a through 18c and 19a through 19c (FIGURE 2) and back walls 20a through 20c, respectively. As can be seen by reference to FIGURE 1, the chambers 12a through 12c are disposed in spaced relationship to one another along an axis of alignment which intersects the top and bottom walls 14a through 14c and 16a through 16c and the space between adjacent chambers is enclosed by vertically disposed plates 21 at the forward and rear edges thereof.

Figure 2:
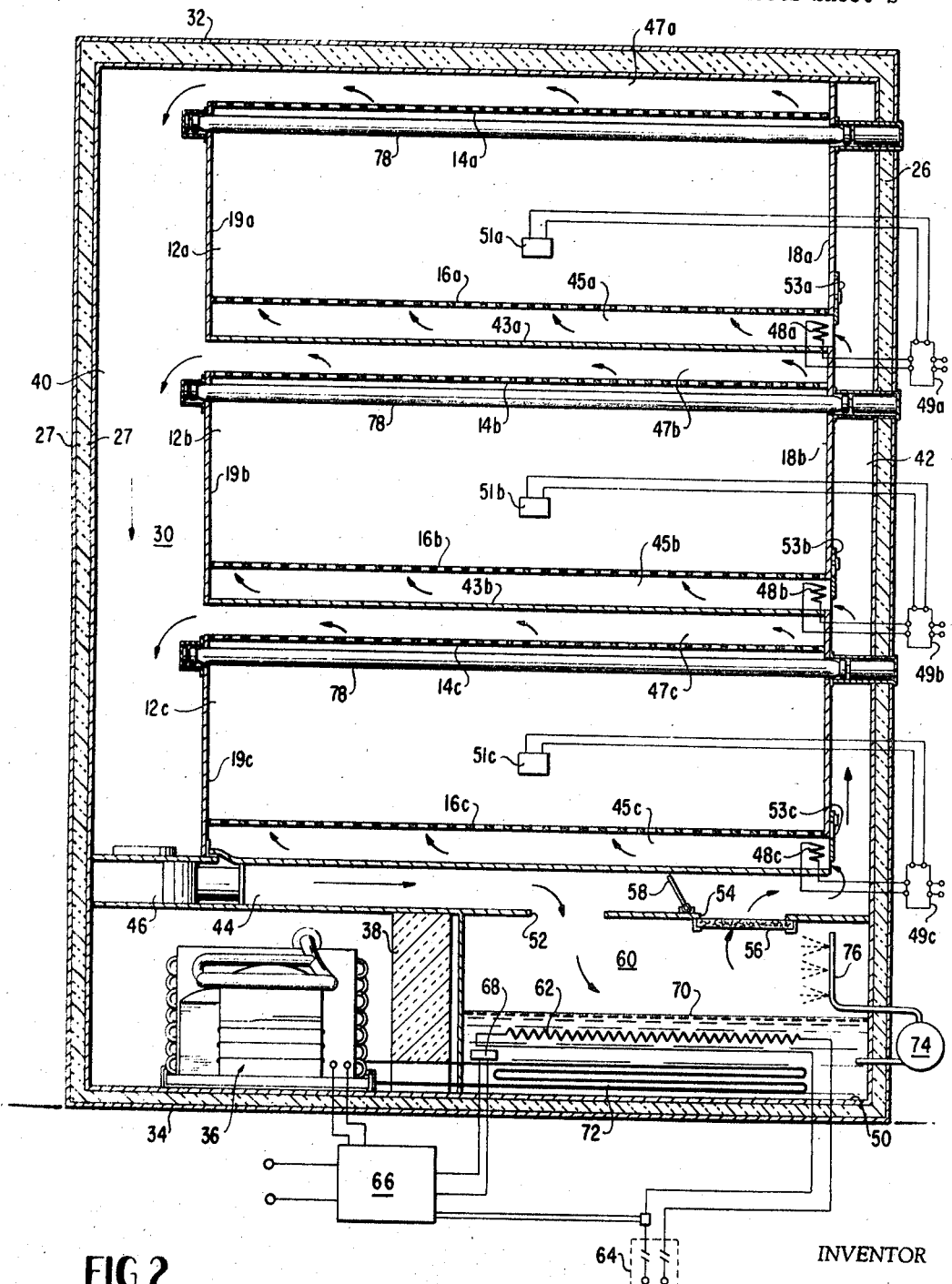
FIGURE 2 is a vertical sectional view through the compartment of FIGURE 1.

Referring now to both FIGURES 1 and 2, cabinet 10 comprises double walled, insulation-filled side panels 26 and 27, disposed in spaced relationship to the non-axis of alignment intersecting side walls 18a through 18c and 19a through 19c of the respective chambers. The remaining sides of the cabinet comprise insulation-filled front and back panels 28 and 30, respectively, and insulation-filled, double walled top and bottom panels 32 and 34. A pair of doors 22 provide access to the cabinet 11 through the front panel 28.

Heating coils 25 are disposed within the doors 22 to provide means to control the temperature of the inner surfaces thereof to thereby prevent condensation moisture forming thereon due to temperature differentials between the surfaces and the interior of the chambers 12a through 12c.

A refrigeration unit, shown generally at 36, is mounted in the cabinet 10 beneath the compartment 11 on a movable shelf (shown in an extended, servicing position in FIGURE 1). An insulated panel 38 is disposed adjacent the unit 36 to isolate the unit from the remainder of the apparatus.

Referring now more particularly to FIGURE 2, the space between the side walls 19a through 19c and the side panel 27 forms an outlet distribution channel 40 while the corresponding space between the side walls 18a through 18c and the side panels 26 forms an inlet distribution channel 42. A transverse channel 44, formed beneath the bottom wall 16c of the bottom chamber 12c, interconnects the outlet distribution channel 40 with the inlet disribution channel 42. A fan or blower 46 is disposed in the outlet distribution channel 40 in communication with the channel 44 to circulate gas through the chambers 12a through 12c as is shown by the arrows in FIGURE 2. Transverse panels 43a and 43b bisect the space between the chambers 12a through 12c to form, in conjunction with the adjacent top and bottom walls 16a and 14b and 16b and 14c, respectively, inlet plenums 45a and 45b and outlet plenums 47b and 47c, respectively. The space between the top panel 32 and the top wall 14a of chamber 12a defines an outlet plenum 47a while the space between the bottom wall 16c of the chamber 12c and the top of the transverse channel 44 forms an inlet plenum 45c.

The inlet plenums 45a through 45c have, disposed therein, heating coils 48a through 48c connected, through controls 49a through 49c, to suitable sources of electric power (not shown). Temperature sensing devices 51a through 51c are located in chambers 12a through 12c and are connected to the respective controls 49a through 49c.

Valve means, shown for purposes of illustration as slide valves 53a through 53c, are disposed between the inlet distribution conduit 42 and the respective inlet plenums 45a through 45c. By suitable adjustment of the vertical positioning of the slide valves 53a through 53c, the volume of gas flowing through each of the chambers 12a through 12c may be balanced or proportioned as desired.

A fluid holding tank 50 is located subjacent the channel 44 and is in communication therewith through openings 52 and 54. The opening 54 has, provided therein, a filter 56, of any type standard in the art, to remove impurities from the gas flowing therethrough and droplets of liquid which may be suspended in the gas stream. A valve means, illustrated as a movable flapper valve 58, is disposed in the channel 44 between the opening 52 and the opening 54 whereby a portion of the gas stream passing along the channel 44 may be bypassed from a gas treating zone 60 in the tank 50 and recirculated directly to the inlet distribution channel 42. This valve means provides additional control for the controlled environment chambers as will be described below.

Arranged in the tank 50 are a heater coil 62, connected to a suitable source of electric power (not shown) through a pair of manual circuit breakers 64, the heat output of which is governed by a control device 66 which is connected to a source of low voltage supply (not shown). A sensing element, which may comprise a thermistor 68, is disposed in the tank 50 and connected to the control 66. The coil 62 and sensing element 68 are submerged in a water sump 70 formed in the tank 50.

A cooling coil 72, connected to the refrigeration apparatus 36, is also submerged in the sump 70 to provide cooling for the fluid therein as required. The refrigeration unit 36 is also connected to the control 66 in such a manner that, by suitable adjustment of the control device, heat may be added to the sump 70 through the heating coil 62 or removed therefrom through the cooling coil 72 to maintain a desired temperature therein. Devices suitable for achieving such control are standard in the art and, since the device per se does not constitute a portion of this invention, further detailed description thereof is not included herein.

An electric pump 74 communicates with a plurality of spray nozzles 76 disposed in the gas treatment zone 60 and with the liquid sump 70 whereby humidifying and temperature conditioning liquid is, in part, continuously recirculated.

The aforedescribed insulated walls help reduce to a minimum heat transfer between the chambers 12a through 12c and the ambient atmosphere. Such insulation may be of any type standard in the art such, for example, as foam polyurethane, glass wool or the like or may comprise an evacuated area between the aforedescribed double walls.

While no particular form of perforate wall is illustrated, a hard board wall having one quarter inch diameter perforations on, for example, one half inch centers, would provide satisfactory uniform gas flow through the chamber.

The heating coils 48a through 48c, positioned in the inlet plenums 45a through 45c, are conventional electric coils connected to a suitable source of electric current through a thermostat means (not shown) whereby the temperature of the coils may be suitably adjusted and maintained to thereby finally adjust the temperature and humidity of the gas stream to the desired value immediately prior to entrance thereof into the respective chambers. This final adjustment provides means to closely control the properties of the gas flow in the chambers without the requirement of predicting variations due to duct loss, heat transfer or ambient conditions.

Figure 3:
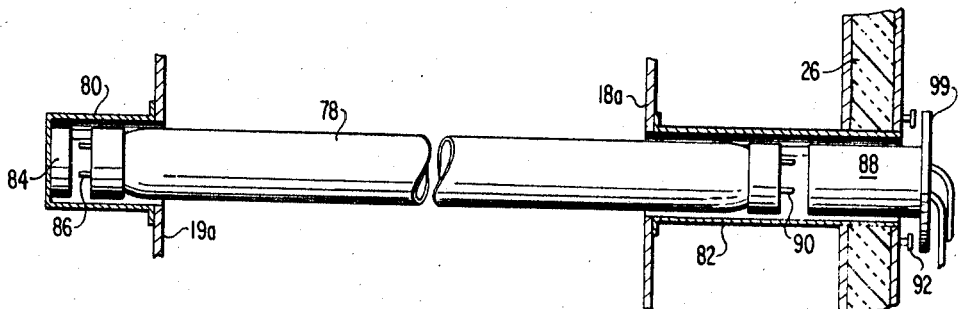
FIGURE 3 is an enlarged fragmentary view in section of a portion of the apparatus of FIGURE 1.

As illustrated in FIGURES 2 and 3, a plurality of lights, illustrated as fluorescent lights 78, are mounted adjacent the top walls 14a through 14c of the chambers 12a through 12c. As is better shown in FIGURE 3, the lights 78 extend into opposed recesses formed by tubes 80 and 82 attached to the exterior surfaces of the walls 19a and 18a. The tube 80 is closed at the outer end thereof and contains therein a socket 84 which receives the contacts 86 on one end of the light 78, while the tube 82 has a socket 88 removably disposed therein for connection to the contacts 90 on the other end of the light. Attachment of the socket 88 is achieved through lugs 92 on the outer surface of the side panel 26 which engage elongated keyholes (not shown) in a flange 94 on the socket 88. The above-described structure allows for replacement of the light 78 through the side panel 26 without substantial loss of heat through the structure thereof. The lights may be used, not only to illuminate the respective chambers, but also to provide a desired amount of actinic or ultraviolet light for use in conducting certain experiments which may be desired to be carried out in a controlled environment.

During the use of the controlled environment device of this invention, the material to be subjected to the controlled environment is placed in the chambers 12a through 12c on shelves, racks or like structures which will permit storage of material without materially interfering with the vertical movement of air as is illustrated by the arrows.

In operation of the device, the temperature regulating controls 49a through 49c and 66 are energized. The valves 53a through 53c are set to provide the desired distribution of gas through the chambers 12a through 12c and the pump and fan are energized to initiate circulation of gas through the chambers and liquid through the gas treating zone 60. Bypassed gas, flowing through the gas treating zone 60, is saturated by the liquid sprayed from the nozzle 76 and is thereby humidified and simultaneously brought to a temperature condition proximate that in the sump 70. The gas stream is then passed through the filter 56 into the inlet distribution channel 42 through the heating coils 48a through 48c to finally adjust the temperature and the relative humidity of the gas stream to the values desired in the chambers 12a through 12c. By suitably controlling the quantity of gas stream which is to flow through the chamber 60 and to become saturated at the predetermined temperature of the liquid in the sump 70, the relative humidity and the final temperature of the gas stream, after passing the heating coils 48a through 48c, is critically maintained. The gas stream then flows into the inlet plenums 45a through 45c, through the bottom walls 16a through 16c, sweeping uniformly across the chambers 12a through 12c to the outlet plenums 47a through 47c and ultimately to the outlet distribution channel 40.

Where lights such as 78 are installed in the chambers, a certain amount of heat will be added to the gas stream. However, by suitably regulating the amount of heat added to the gas stream by the heating coils 48a through 48c and by having a substantial volume of gas flowing constantly through the chambers 12a through 12c, very uniform temperature and humidity may be obtained throughout the chambers. Where the desired humidity and temperature cannot be fully maintained by steps of saturating and heating the gas stream, the valve 58 may be adjusted to permit a predetermined portion of the air flowing in the channel 44 from the chambers 12a through 12c to recirculate through the heating coils 48a through 48c. This bypassed, non-rehumidified air mixing with the gas stream flowing from the gas treating zone 60 provides a further measure of control for the chambers.

If the use of the device so dictates, individual chambers may be fully removed from the environmental control by closing the corresponding inlet valve from the inlet distribution channel 42. For example, if it were desired to maintain a controlled environment in chamber 12b alone, the valves 53a and 53c would be moved downwardly to close the inlets to the plenums 45a and 45c, thereby removing the chambers 12a and 12c from the flow of gas.

With the above-described structure it is also possible to conduct different experiments at different humidity conditions in the individual chambers. By suitable adjustment of the respective controls 49a through 49c, different temperature levels may be maintained in the individual chambers 12a through 12c and different gas flow rates may also be achieved by proper manipulation of the valves 53a through 53c. Varying treatment in the chambers may also be achieved by substitution of the fluorescent lights 78 in one or more of the chambers with actinic or ultraviolet lights, as desired.

With the present invention, it is possible to construct test chambers that are capable of maintaining the temperature within the chambers 12a through 12c at plus or minus .25° F. and at a humidity within plus or minus .50% of the control points, the test chamber operating at control points of 90° F. dry bulb temperature and 90% relative humidity. It has also been found that substantially equivalent control can be maintained in ambient temperature ranges between 50 and 95° F.

From the foregoing description of the preferred embodiment of the present invention, it can be seen that an improved environmental multi-chambered device has been provided. Throughout the discussion of the embodiment of the invention, the gas employed has been air, however, it will be apparent to those skilled in the art, that in a sealed, recirculating chamber type device as disclosed herein, an inert atmosphere such as nitrogen may be maintained in the chamber. Further, the gas may comprise a mixture of gases which may be high in oxygen, high in $CO_2$, high in CO and the like, without departing from the principles of the invention. Further, in addition to injecting water into the gas stream to provide a saturated gas, other liquid treating agents may be employed so that an atmosphere having bactericidal or fungicidal properties may be maintained in the chamber.

It will be further recognized by those skilled in the art that, while the specific controls for regulating the temperature of the coils 25 and 48a through 48c or the temperature of the heating and cooling coils 62 and 72 are not illustrated, a wide variety of commercial means including recorders may be employed with the environmental chamber of the invention.

It should therefore be understood that, within the scope of the appended claims, the invention may be practiced other than as specifically described.

What is new and therefore desired to be protected by Letters Patent of the United States is:

1. A temperature and humidity controlled compartment comprising:
   (a) an enclosure;
   (b) a plurality of chambers disposed in said enclosure;
   (c) gas inlet and outlet distribution channels disposed adjacent said chambers;
   (d) the top and bottom walls of each said chambers being perforate throughout;
   (e) a gas inlet plenum positioned in coextensive relationship with the said bottom perforate wall exteriorly of each of said chambers and in communication with said gas outlet distribution channel;
   (f) gas treating means communicating with said gas inlet and outlet distribution channels;
   (g) fan means for directing gas through said gas treating means, said gas inlet distribution channel, said inlet plenums, through each of said chambers to said outlet plenums, and through said outlet distribution channel to said gas treating means.

2. A compartment in accordance with claim 1 wherein valve means are disposed between each of said gas inlet plenums and said gas inlet distribution channel to controllably regulate the flow of gas therebetween.

3. A compartment in accordance with claim 2 wherein heating means are disposed in each of said gas inlet plenums.

4. A compartment in accordance with claim 3 wherein said heating means includes a temperature sensor in each of said chambers and a corresponding control to independently regulate the supply of heat to gas in each of said inlet plenums.

5. A compartment in accordance with claim 4 wherein said chambers are disposed in vertical relationship to each other and rectangular, and wherein said inlet and outlet distribution channels are vertical.

References Cited

UNITED STATES PATENTS

| | | | |
|---|---|---|---|
| 916,454 | 3/1909 | Koons | 236—2 |
| 2,107,523 | 2/1938 | Coe | 237—53 |
| 2,345,277 | 3/1944 | McGrath | 237—8 X |
| 2,806,674 | 9/1957 | Biehn. | |
| 3,247,895 | 4/1966 | Phillips | 165—50 |
| 3,354,946 | 11/1967 | Dean | 165—50 X |

EDWARD J. MICHAEL, Primary Examiner